United States Patent
Droms et al.

(10) Patent No.: US 10,742,592 B2
(45) Date of Patent: *Aug. 11, 2020

(54) DYNAMIC DNS-BASED SERVICE DISCOVERY

(71) Applicant: Cisco Technology, Inc., San Jose, CA (US)

(72) Inventors: Ralph Droms, Concord, MA (US); Timothy P. Donahue, Natick, MA (US)

(73) Assignee: Cisco Technology, Inc., San Jose, CA (US)

(*) Notice: Subject to any disclaimer, the term of this patent is extended or adjusted under 35 U.S.C. 154(b) by 155 days.

This patent is subject to a terminal disclaimer.

(21) Appl. No.: 15/652,094

(22) Filed: Jul. 17, 2017

(65) Prior Publication Data

US 2017/0317968 A1 Nov. 2, 2017

Related U.S. Application Data

(63) Continuation of application No. 14/447,475, filed on Jul. 30, 2014, now Pat. No. 9,712,485.

(51) Int. Cl.
*H04L 29/12* (2006.01)
*H04L 12/24* (2006.01)

(52) U.S. Cl.
CPC ......... *H04L 61/1511* (2013.01); *H04L 41/12* (2013.01); *H04L 61/1541* (2013.01); *H04L 61/2076* (2013.01)

(58) Field of Classification Search
CPC ............ H04L 61/1511; H04L 12/4612; H04L 63/0272; G06F 15/16; G06F 17/30896

(Continued)

(56) References Cited

U.S. PATENT DOCUMENTS 6,154,777 A 11/2000 Ebrahim
7,228,359 B1 6/2007 Monteiro
(Continued)

FOREIGN PATENT DOCUMENTS

CN 103891247 6/2014
EP 2725873 A1 4/2014
(Continued)

OTHER PUBLICATIONS

European Patent Office, "Search Report" in application No. 15 736 887.9-1213, dated Jan. 16, 2019, 9 pages.

(Continued)

*Primary Examiner* — Tesfay Yohannes
(74) *Attorney, Agent, or Firm* — Lee & Hayes, P.C.

(57) ABSTRACT

Techniques are provided for performing dynamic DNS-SD. In an embodiment, an apparatus includes one or more databases, one or more transceivers to receive a first Domain Name System (DNS) query from a first computing device, the first DNS query defining a first service discovery name space, and one or more processors in communication with each of the one or more databases and the one or more transceivers. The one or more processors generate and append a first metadata associated with the first computing device to the first DNS query. The one or more transceivers transmit the first DNS query and the first metadata to a Domain Name System (DNS) server computer, receive, from the DNS server computer, a first response responsive to the first DNS query, and relay, to the first computing device, the first response.

20 Claims, 4 Drawing Sheets

(58) Field of Classification Search
USPC .................. 709/214, 222, 224; 370/328, 331
See application file for complete search history.

(56) References Cited

U.S. PATENT DOCUMENTS

| | | | | |
|---|---|---|---|---|
| 7,636,791 | B2* | 12/2009 | Shimada | H04L 29/12009 709/218 |
| 8,130,718 | B2* | 3/2012 | Shaheen | H04W 36/14 370/331 |
| 8,161,184 | B2 | 4/2012 | Sekar | |
| 8,793,343 | B1* | 7/2014 | Sorenson, III | G06F 11/2025 709/219 |
| 8,897,952 | B1* | 11/2014 | Palmer | G07C 5/008 701/31.5 |
| 9,107,164 | B1 | 8/2015 | Troyanker et al. | |
| 2002/0105955 | A1* | 8/2002 | Roberts, III | H04B 7/18584 370/401 |
| 2005/0030917 | A1* | 2/2005 | Haller | H04L 29/12311 370/328 |
| 2005/0141568 | A1* | 6/2005 | Kwak | H04J 3/1617 370/539 |
| 2007/0086382 | A1* | 4/2007 | Narayanan | H04L 63/0892 370/331 |
| 2007/0202800 | A1* | 8/2007 | Roberts | H04H 20/103 455/3.02 |
| 2009/0083406 | A1* | 3/2009 | Harrington | G06F 15/16 709/222 |
| 2013/0173769 | A1 | 7/2013 | Seastrom | |
| 2014/0019641 | A1 | 1/2014 | Kitamura | |
| 2014/0214958 | A1 | 7/2014 | Cheshire | |
| 2014/0310811 | A1* | 10/2014 | Hentunen | H04L 63/1441 726/23 |
| 2015/0074221 | A1* | 3/2015 | Kuparinen | H04L 29/12066 709/214 |
| 2015/0089061 | A1 | 3/2015 | Li | |
| 2015/0142968 | A1 | 5/2015 | Bhagwat | |
| 2015/0256404 | A1 | 9/2015 | Evans | |
| 2016/0036762 | A1* | 2/2016 | Droms | H04L 61/1511 709/224 |
| 2016/0127305 | A1 | 5/2016 | Droms | |

FOREIGN PATENT DOCUMENTS

| | | |
|---|---|---|
| KR | 2013 0103145 A | 9/2013 |
| KR | 20130103145 | 9/2013 |
| WO | WO2013/041350 | 3/2013 |
| WO | WO2013041350 | 3/2013 |

OTHER PUBLICATIONS

European Claims in application No. 15 736 887.9-1213, dated Jan. 2019, 11 pages.

International Searching Authority, "Search Report", in application No. PCT/US2015/038637, dated Sep. 30, 2015, 9 pages.

Claims in application No. PCT/US2015/038637, dated Sep. 2015, 5 pages.

Cheshire, S. et al., "DNS Based Service Discovery", Internet Engineering Task Force, Request for Comments: 6763, dated Feb. 2013, 49 pages.

The Chinese Office Action dated Aug. 19, 2019, for Chinese Patent Application No. 201580040777.3, a counterpart foreign application of the U.S. Appl. No. 14/447,475, 9 pages.

The Chinese Office Action dated Feb. 3, 2020, for Chinese Patent Application No. 201580040777.3, a counterpart foreign application of the U.S. Appl. No. 14/447,475, 7 pages.

The European Patent Office Office Action, "Communication pursuant to Article 94(3) EPC," dated Sep. 30, 2019 for European patent application No. 15 736 887.9-1213, 9 pages.

The European Office Action dated Sep. 30, 2019 for European Patent Application No. 15736887.,9, a counterpart of U.S. Appl. No. 15/652,094, 9 pages.

\* cited by examiner

DYNAMIC DNS-BASED SERVICE DISCOVERY

BENEFIT CLAIM

This application claims the benefit under 35 U.S.C. § 120 as a continuation of application Ser. No. 14/447,475, filed Jul. 30, 2014, now U.S. Pat. No. 9,712,485, the entire contents of which are hereby incorporated by reference as if fully set forth herein. Applicants hereby rescind any disclaimer of subject matter that may have been made in the parent application and advise the Office that the claims of the present application may be broader than those presented or granted in the parent application.

FIELD OF THE DISCLOSURE

The present disclosure relates to communication networks. The disclosure relates more specifically to computer-implemented techniques for performing dynamic service discovery based upon the domain name system (DNS).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A domain name system (DNS) query is generally used to obtain an Internet Protocol (IP) address corresponding to a particular domain name and associated with a particular device in a network. A standard DNS query may also facilitate service discovery. A standard DNS query may be constructed to discover instances of a desired service available within a network or domain. This type of service discovery is referred to as DNS-based Service Discovery (DNS-SD).

In response to a DNS query associated with DNS-SD, a responding computer provides a list of device instances within a domain that are capable of providing a desired service specified by the requesting device. The requesting device specifies in the DNS query the type of desired service and the specific domain in which the requesting device is looking for that service. For example, the requesting device may be looking for printer services within its local network and may send a DNS query to find out which printer services are available in the network. If a second device also makes the same DNS query, the same list of device instances is returned to this second device; the same DNS query generally returns the same response. Once the requesting device has obtained a list of available printer services, it can provision a subsequent DNS query to find out exactly how to contact that service (e.g., via the name and/or the IP address of the device providing the service).

However, not every device instance in the response list may actually be relevant or useful to the requesting device. For example, if the requesting device is located in building A of a geographically large campus domain that includes buildings A through Z, then receiving a list of printer capable instances in buildings A through Z may be more than the requesting device needs. It is unlikely that a user of the requesting device will print to a printer capable instance located outside of building A.

DNS-SD can be performed in a de-centralized or centralized environment. In the de-centralized case, also referred to as multi-cast DNS, DNS-SD is performed without involving a centralized repository, such as a DNS server. Instead, a device looking for a particular type of service multi-casts a DNS query to all devices in its local network. Those devices within the local network capable of providing the particular type of service respond to the requesting device. Thus, the response to the multi-cast DNS query comprises a list of device instances within the local network having the desired service. A particular instance from the list of device instances can then be selected to access the desired service from the particular device instance.

In the centralized case, also referred to as uni-cast DNS, DNS-SD is performed using a centralized repository, such as a DNS server. (In practice, the DNS server may be one computer in a hierarchy of computers, and a first DNS server in the hierarchy may fail-over the request to the next computer in the hierarchy if the first does not have responsive data.) A device looking for a particular type of service in a particular domain uni-casts a DNS query to the DNS server. The DNS server returns a list of device instances within the particular domain having the desired service.

Although multi-cast DNS does not require a DNS server, a drawback of using multi-cast DNS is the more limited network or scope from which device instances capable of the desired service are found. Typically the scope of responsive data is limited to the local network of the requesting device. As such, the device attempting to discover a particular service may not receive information about all of the services of interest. Uni-cast DNS encompasses services accessible on one or more sub-networks and extends beyond the local network of the requesting device.

DESCRIPTION OF EXAMPLE EMBODIMENTS

Figure 1:
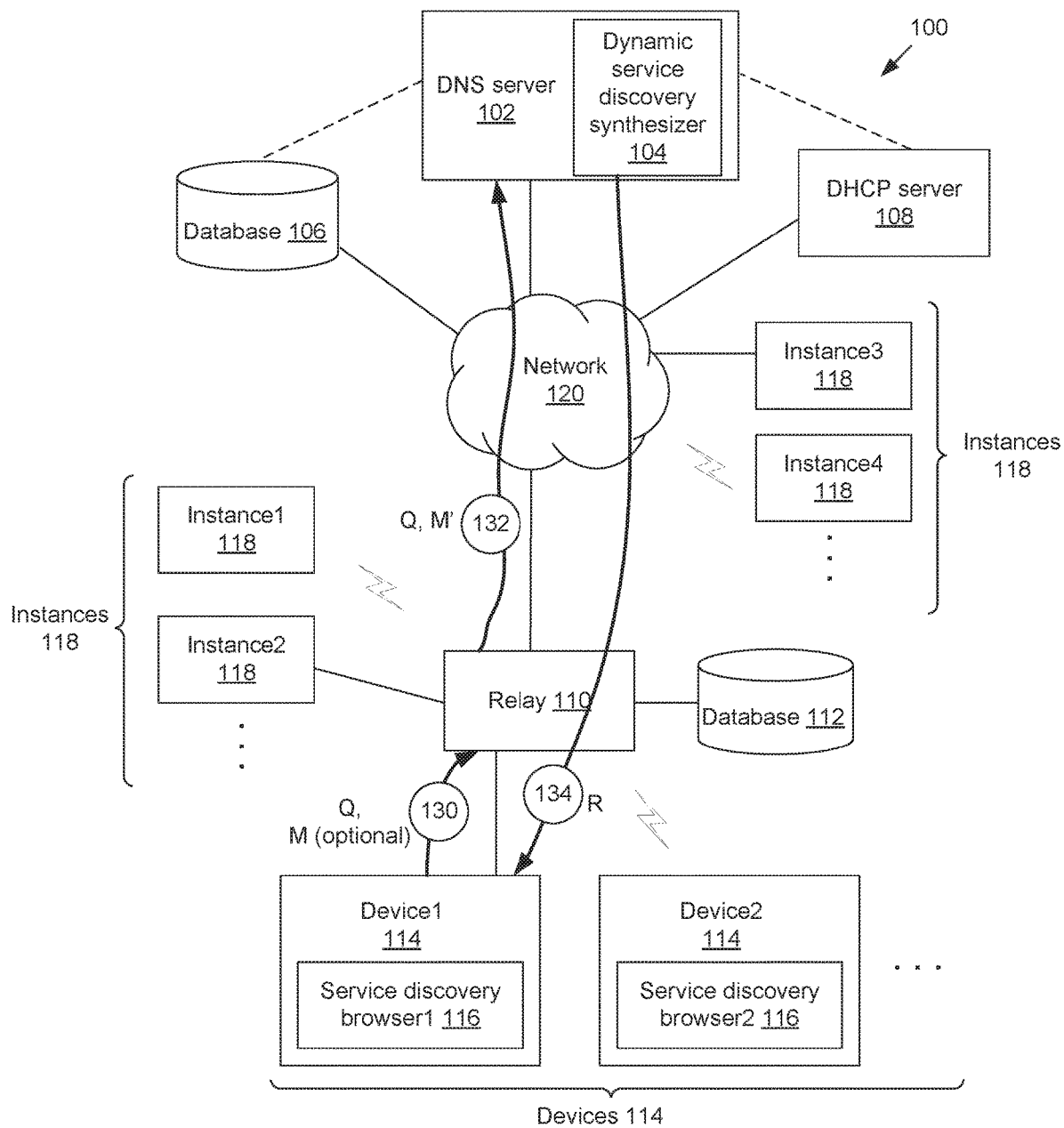
FIG. 1 illustrates an example system for performing dynamic DNS-SD according to some embodiments.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

1.0 Overview

In an embodiment, an apparatus, comprising: one or more databases; one or more transceivers to receive a first Domain Name System (DNS) query from a first computing device, the first DNS query defining a first service discovery name space; and one or more processors in communication with each of the one or more databases and the one or more transceivers. The one or more processors generate and append a first metadata associated with the first computing device to the first DNS query, at least a portion of the first metadata obtained from the one or more databases. The one or more transceivers transmit the first DNS query and the first metadata to a Domain Name System (DNS) server computer, receive, from the DNS server computer, a first response responsive to the first DNS query, the first response comprising identification of one or more service providing computing devices within a subset of the first service discovery name space in accordance with the first DNS query and the first metadata associated with the first computing device, and relay, to the first computing device, the first response.

In an embodiment, a data processing method comprising: receiving, at a Domain Name System (DNS) server computer, a Domain Name System-based Service Discovery (DNS-SD) query generated by a first computing device; using the DNS server computer, dynamically selecting one or more service providing computing devices from DNS resource records based on the DNS-SD query and metadata associated with the first device; using the DNS server computer, synthesizing a query response corresponding to the dynamically selected one or more service providing computing devices, the query response including pointer (PTR) resource records associated with the dynamically selected one or more service providing computing devices; using the DNS server computer, transmitting the query response to the first computing device; and wherein the method is performed by one or more computing devices.

In an embodiment, a non-transitory computer-readable data storage medium storing one or more sequences of instruction which, when executed by one or more processors, cause performing a method comprising: receiving, at a Domain Name System (DNS) server computer, a Domain Name System-based Service Discovery (DNS-SD) query generated by a first computing device; dynamically selecting one or more service providing computing devices from DNS resource records based on the DNS-SD query and metadata associated with the first computing device; synthesizing a query response corresponding to the dynamically selected one or more service providing computing devices, the query response including pointer (PTR) resource records associated with the dynamically selected one or more service providing computing devices; and transmitting the query response to the first computing device.

2.0 Structural & Functional Example

In an embodiment, a programmatic method enables performing dynamic Domain Name System (DNS)-based Service Discovery (DNS-SD) using standard Domain Name System (DNS) queries. A device wishing to discover a list of available instances of a particular service type generates a standard DNS-SD query. The DNS-SD query is sent to a DNS server via at least one relay machine or computer. Metadata describing or associated with the requesting device is also provided with the DNS-SD query to or at the DNS server. The metadata may be generated by the requesting device, the relay machine, and/or the DNS server. In an embodiment, the DNS server performs dynamic discovery of instances of the particular service type within the domain named in the DNS-SD query based on the metadata associated with the device; thus, in some embodiments the metadata may be the source of constraints on the scope of a search or the scope or relevant data returned in a discovery response. In other embodiments, the DNS server performs dynamic discovery of instances of the particular service type within the domain named in the DNS-SD query based on the metadata associated with the requesting device and a pre-defined selection rule. Metadata comprises one or more characteristics associated with and/or describing the device, an account, a user, or an environment. The pre-defined selection rule comprises an additional instance selection constraint that may not necessarily be device specific. In other embodiments, the search domains used by the device performing service discovery are configured by responses from the DNS server, which are themselves selected based on the metadata associated with the requesting device and/or service discovery browser.

The dynamic DNS-SD techniques described herein may provide a way for a service discovery browser in the querying device to be automatically configured with potentially different search domain lists for the same query. Even without changes to the service discovery browser or the DNS-SD query, the dynamic DNS-SD techniques described herein provide a way to flexibly restrict service discovery to a particular logical domain or a subset of the domain actually defined in the DNS-SD query. Consequently, the same DNS-SD query issued by different service discovery browsers or by the same service discovery browser at different times may return different query responses. If the same query is made by two different devices, each of the two devices may receive a different list of instances because the metadata associated with each of the two devices may be different from each other. If the same query is made by the same device in two different device states, then the query may also cause a different list of instances to be returned each time. The particular device state is reflected in the metadata associated with the requesting device.

Various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will realize that embodiments of the disclosure may be practiced without the use of these specific details. In other instances, well-known structures and processes are not shown in block diagram form in order not to obscure the description of the disclosure with unnecessary detail. Thus, the present disclosure is not intended to be limited to the embodiments shown, but is to be accorded the widest scope consistent with the principles and features disclosed herein.

FIG. 1 illustrates an example system 100 to facilitate dynamic DNS-SD techniques according to some embodiments. System 100 includes a DNS server 102, a database 106, a Dynamic Host Configuration Protocol (DHCP) server 108, a relay 110, a database 112, one or more devices 114, one or more instances 118, and a network 120. Each of the DNS server 102, database 106, DHCP server 108, relay 110, and at least one or more of the instances 118 is in wired or wireless communication with the network 120. Each of the devices 114, database 112, and at least one or more of the instances 118 is in wired or wireless communication directly or indirectly with the relay 110.

DNS server 102 comprises one or more servers, computers, processors, or databases configured to communicate with the database 106, DHCP server 108, and/or relay 110 via network 120. DNS server 102 may be located at one or more geographically distributed locations. DNS server 102 stores and maintains a plurality of DNS resource records (RRs) that map domain names to Internet Protocol (IP) and Internet Protocol Version 6 (IPv6 or IP6) addresses. The DNS RRs also include information about the respective resources associated with the IP/IP6 addresses in pointer (PTR) records, service locator (SRV) records, text (TXT) records, and the like. The DNS RRs may also be referred to as DNS-SD records or DNS-SD RRs, and RRs may also be referred to as records. Additional details about DNS RRs are provided in Internet Engineering Task Force (IETF), Request for Comments (RFC) 6763, DNS-Based Service Discovery, February 2013 (hereinafter "RFC 6763"). DNS server 102 includes a dynamic service discovery synthesizer 104, discussed in detail below, to facilitate implementation of dynamic DNS-SD techniques. DNS server 102 handles DNS queries, as discussed in detail below.

Database 106 comprises one or more databases or storage devices for storing data and/or instructions for use by the DNS server 102. Database 106 may include at least some of the DNS RRs, additional data associated with DNS RRs (for which no standard records have been defined), or other information associated with the mapped resources. Database 106 is configured to communicate with the DNS server 102 via network 120. Alternatively, database 106 may communicate with the DNS server 102 without use of the network 120. In some embodiments, when DNS server 102 is capable of storing all of the DNS related data, database 106 may be optional. In some embodiments, database 106 may be included in DNS server 102.

DHCP server 108 comprises one or more servers, computers, processors, or databases configured to assign an IP address to a new resource and create DNS RRs corresponding to the new assignment. During the assignment process, the DHCP server 108 can also obtain or determine additional information about the resource that supplements the DNS RRs. For example, ownership information may be obtained. Once assignment is completed, the DNS RRs are sent to the DNS server 102 to facilitate handling of DNS queries. Data supplementing the DNS RRs can be maintained on the DHCP server 108, sent to the DNS server 102, and/or sent to the database 106. DHCP server 108 communicates with the DNS server 102 via network 120. Alternatively, DHCP server 108 may communicate with the DNS server 102 without the use of network 120.

Relay 110 comprises one or more relay agents. Examples of relay agents that may be used in various embodiments include routers, switches, gateways, firewalls, repeaters, and the like. In an embodiment, relay 110 serves as the intermediary to the DNS server 102 for devices 114 via network 120. Relay 110 facilitates traffic monitoring and management of data communications within its local network. Relay 110 includes a database and/or communicates with an external database, such as database 112, to potentially analyze, process, format, and/or append information to received data prior to forwarding the received data to the intended recipient. Relay 110 communicates via wired and/or wireless connection to each of the devices 114. Relay 110 communicates with the DNS server 102 via network 120.

Devices 114 comprise computing devices. Examples of devices 114 that may be used in various embodiments include work stations, personal computers, general purpose computers, laptops, Internet appliances, hand-held devices, wireless devices, wired devices, portable devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of devices 114 includes applications, software, or instructions to facilitate dynamic DNS-SD described herein. In an embodiment, each of the devices 114 hosts or executes a service discovery browser 116 that is configured to process DNS requests in the manner described further herein. Devices 114 may also include additional applications or other necessary interface capabilities to communicate with the DNS server 102, relay 110, and/or one or more of the instances 118. Devices 114 may be located geographically dispersed from each other and/or the relay 110. For purposes of illustrating a clear example, two (2) devices 114 are shown in FIG. 1, but in other embodiments any number of devices may be included in system 100. Devices 114 are also referred to as clients, hosts, requesting devices, requesting clients, requesting hosts, requesting machines, requestors, and the like.

Instances 118 comprise computing devices capable of providing one or more services (or one or more types of services) requested by devices 114, including but not limited to, printers, facsimile machines, scanners, photocopiers, displays, projectors, televisions, set-top boxes, gaming consoles, multi-media consumption devices, video output devices, audio output devices, storage devices, input devices, output devices, network services devices, network management systems, SDN controllers, mobility controllers, authentication servers, time servers, Internet of Things-type devices, thermostats, light switches, refrigerators, dishwashers, coffee makers, washers, dryers, building security controller, residential or commercial building appliances, or other service-providing devices. In some embodiments, instances 118 may comprise the service requesting devices and the devices 114 the corresponding service providing devices. In other embodiments, each of the devices 114 and instances 118 may both request a service and provide a service to other ones of the devices 114 and instances 118. Each of instances 118 includes applications, software, or instructions to facilitate dynamic DNS-SD described herein and to communicate with the DNS server 102, relay 110, and/or one or more devices 114. Instances 118 are also referred to as clients, devices, service providing devices, service providing clients, service providers, targets, target devices, and the like.

FIG. 1 shows two (2) groups of the instances 118, a first group within wired or wireless communication range of the relay 110 and a second group within wired or wireless communication range of the network 120. The first group of instances 118 along with the devices 114 may comprise devices within a local network, while the second group of instances 118 may comprise devices outside the local network but still accessible by the devices 114 via the relay 110 and network 120.

Network 120 comprises a communications network, such as any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network. When network 120 comprises a public network, security features (e.g., VPN/SSL secure transport) may be included to ensure authorized access within system 100. In some embodiments, network 120 comprises a wider network than the local network including instances 118, relay 110, and devices 114.

In one embodiment, the DNS query for dynamic service discovery is constructed using special DNS fully qualified domain names (FQDNs), which are composed of one of five special prefixes and an appropriate DNS domain, and requesting SRV records. There are five special prefixes reserved for configuration of the service discovery browsing domain, as set forth in RFC 6763:
- b._dns-sd._udp.
- db._dns-sd._udp.
- r._dns-sd._udp.
- dr._dns-sd._udp.
- lb._dns-sd._udp.

For an example domain named "example.com," the associated RR names would be:
- b._dns-sd._udp.example.com.
- db._dns-sd._udp.example.com.
- r._dns-sd._udp.example.com.
- dr._dns-sd._udp.example.com.
- lb._dns-sd._udp.example.com.

And by performing PTR record requesting queries for these RR names, the conventional query results comprise:
- For b._dns-sd._udp. (also referred to as the b.query): A list of instance names recommended for browsing.
- For db._dns-sd._udp. (also referred to as the db.query): A single recommended default domain for browsing.
- For r._dns-sd._udp. (also referred to as the r.query): A list of domains recommended for registering services using Dynamic Update.
- For dr._dns-sd._udp. (also referred to as the dr.query): A single recommended default domain for registering services.
- For lb._dns-sd._udp. (also referred to as the lb.query): The "legacy browsing" or "automatic browsing" domain or domains.

Reference is made to RFC 6763 for additional details relating to the special prefixes.

For example, assume an organization has a domain named "example.com," and that the DNS namespace for the organization is split into at least four parts, one for each of the first floor of building BXB200, second floor of building BXB200, first floor of building SJC01, and second floor of building SJC01. A device 114 enters a building of the organization and wants to know which instance(s) 118 in the organization's domain are capable of providing a certain service. The DNS query formed by the device 114 to obtain this information may be: b._dns-sd._udp.example.com.

Figure 2:
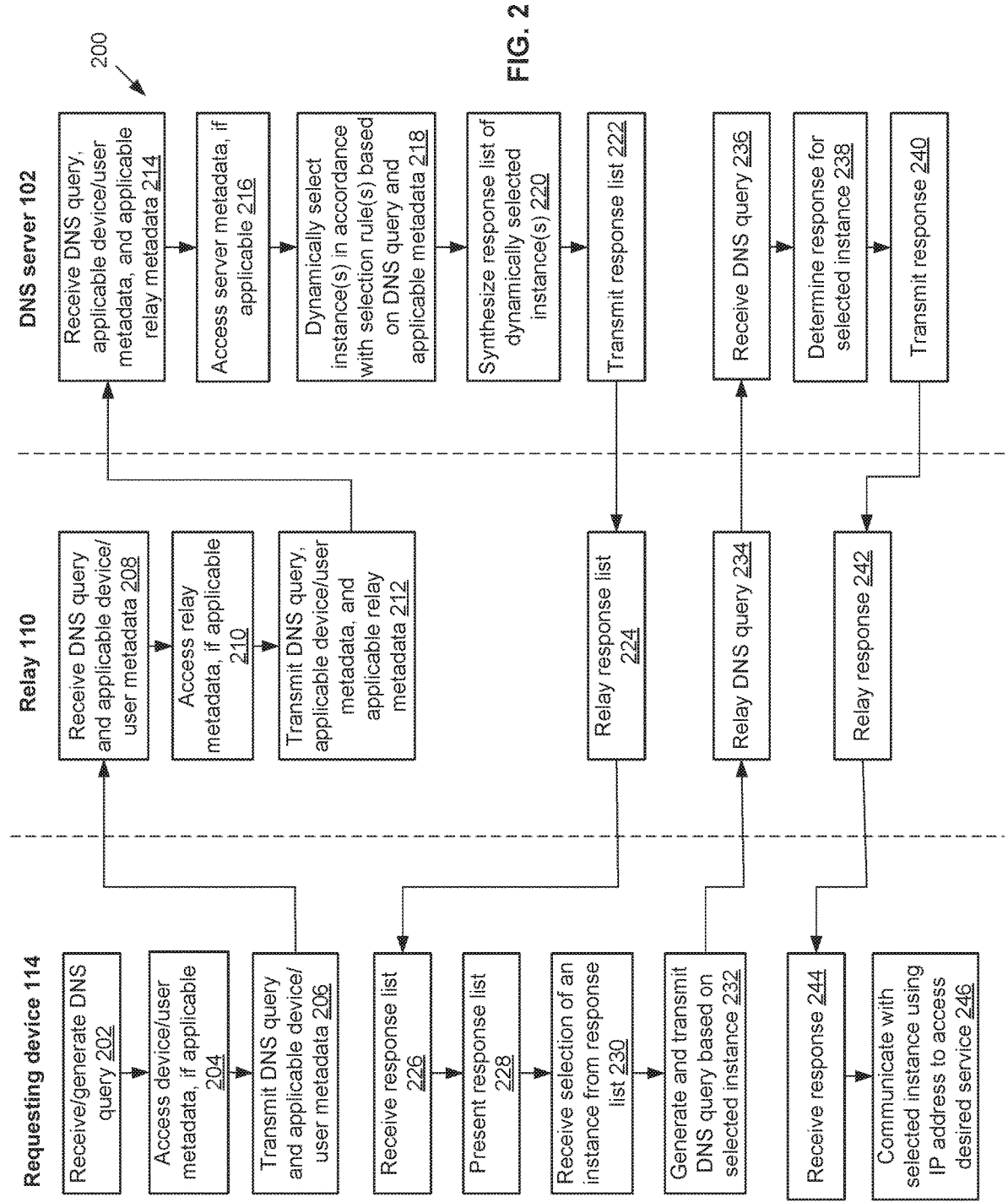
FIG. 2 illustrates an example flow diagram for performing dynamic DNS-SD in the system of FIG. 1 according to some embodiments.
Figure 3:
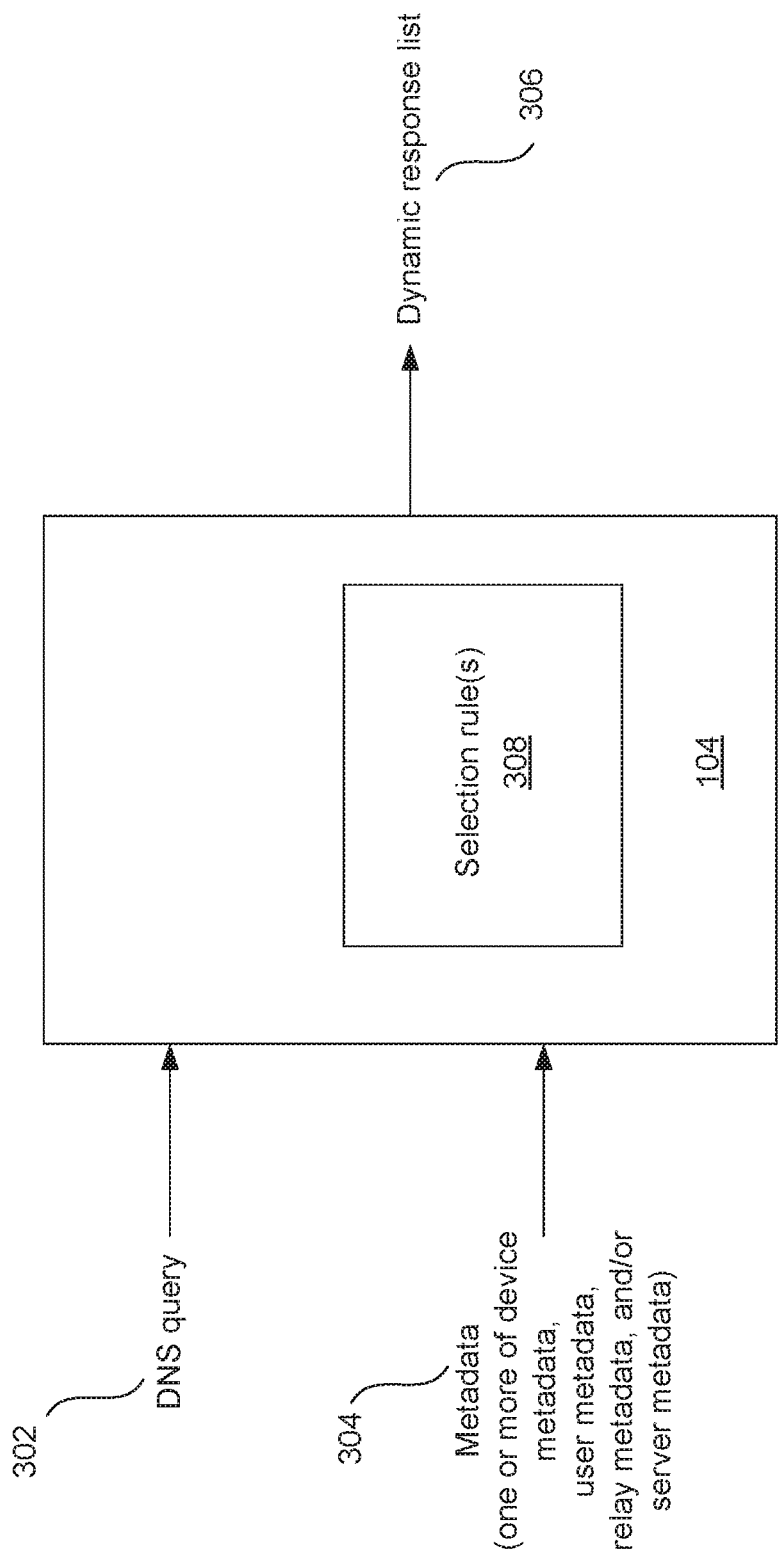
FIG. 3 illustrates an example block diagram showing additional details about the dynamic service discovery synthesizer included in the system of FIG. 1 according to some embodiments.

FIG. 2 illustrates an example process of performing dynamic DNS-SD according to some embodiments. FIG. 2 is described below in conjunction with FIGS. 1 and 3. FIG. 3 illustrates a block diagram showing additional details about the dynamic service discovery synthesizer 104 included in the DNS server 102 according to some embodiments.

In block 202 of FIG. 2, a device 114 receives and/or generates a DNS query for a desired service. A DNS query for a desired service, also referred to as a DNS-SD query, is configured by the service discovery browser 116 included in the device 114. The extent to which the DNS query is automatically generated depends upon the features of the service discovery browser 116. For example, a user interfacing with the device 114 can input the DNS query directly; the browser 116 can provide a user interface (UI) to aid the user in composing a proper DNS query; the user can indicate the desired service in the browser 116 and the browser 116 constructs the DNS query based on the desired service; the user attempts to access a service (e.g., user initiates printing a document) and the browser 116 automatically generates a DNS query to fulfill the service request; or the browser 116 automatically generates a DNS query when the device 114 enters a new network area or experiences a certain state change.

In one embodiment, the DNS query requests a list of FQDN of specific instances of a service. These FQDNs are stored in TXT RRs identified by the FQDN of the service of interest. The list of all service names is maintained in the Internet Assigned Numbers Authority (IANA) Service Name and Transport Protocol Port Number Registry.

For example, the Internet Printing Protocol (IPP) is a popular printing service, widely used by commonly used networked printers. To find a device providing the IPP service, a query for _ipp._tcp.example.com may return:

_ipp._tcp.example.com                    PTR printer1._ipp._tcp.example.com
_ipp._tcp.example.com                    PTR printer2._ipp._tcp.example.com, indicating that there are two instances of the IPP service, named printer1 and printer2.

Next in block 204, the browser 116 accesses device metadata and/or user metadata to append to the DNS query generated in block 202. Device metadata comprises data about the device 114 including, but not limited to, device 114's IP address (also referred to as source IP address), device 114's system information such as its operating system (e.g., iOS, Android, Windows, MacOS, Linux, Blackberry), device 114's connection characteristics (e.g., wired or wireless, estimated bandwidth), authorization information associated with the device 114, device 114's geographic location, measure of device 114's workload, device 114's topological location in the network, and the like. User metadata comprises data about the user interfacing with the device 114 including, but not limited to, user identifier information, user preferences based on user selected preferences or user history (e.g., user prefers color printers over monochrome printers), authorization information associated with the user, and the like. Because a plurality of device and user metadata may exist, the browser 116 may merely use a portion of such metadata. For instance, particular metadata that is also available in the relay 110 or DNS server 102 need not be appended to the DNS query. As another example, the particular metadata appended to the DNS query may depend upon the particular service requested. As another example, the device 114 may be in the best position to have certain current data and thus is a natural source for collecting and sharing such data with other components within the system 100. In any case, the particular device and/or user metadata selected/generated to supplement the DNS query is data that facilitates dynamic service discovery.

In some embodiments, block 204 may be optional depending on availability or handling of metadata associated with the device 114 in relay 110 and/or DNS server 102. As an example, the relay 110 or DNS server 102 may prefer to use its metadata associated with the device 114 for authentication purposes. As another example, the browser 116 may be configured for minimal communication complexity or bandwidth usage, and thus, data that is in addition to the DNS query is discouraged. In other embodiments, the browser 116 may not be configured to append metadata to the DNS query prior to send the DNS query to relay 110. In still other embodiments, the browser 116 comprises a conventional service discovery browser configured to generate a DNS query, and the communication technique used to transmit the DNS query to the relay 110 automatically appends to the DNS query some device- and/or user-associated metadata with the transmission. Header information, for example, may be part of the communication packet that identifies the source of the transmission.

Once the DNS query and device/user metadata, if applicable and/or available, are constructed, the browser 116 transmits the DNS query and applicable device/user metadata to relay 110 in block 206. The device 114 transmits via a wired or wireless connection to the relay 110. FIG. 1 shows an example communication 130 between a particular requesting device (e.g., device 1 114) and the relay 110. The communication 130 comprises a uni-cast transmission of the DNS query (denoted as "Q") and applicable device/user metadata (denoted as "M") to the relay 110.

The transmitted DNS query and applicable device/user metadata are received by the relay 110 in block 208 (see FIG. 2). Next in block 210, relay 110 accesses relay metadata associated with the device 114. Relay metadata comprises data about the device 114 known or maintained by the relay 110. Relay metadata may duplicate at least some of the device/user metadata sent by the device 114. Relay metadata is accessed to confirm the accuracy of at least a portion of the received device/user metadata, to supplement the received device/user metadata, to replace at least a portion of the device/user metadata, to confirm authenticated access to the local network, and/or to provide metadata to the DNS server 102 in the absence of metadata from the device 114.

In response to receiving the DNS query, relay 110 accesses identity management services to, for example, confirm authenticated access and look up the identity of the particular device 114. The device identity maps to the device's IP address, which can be appended to the DNS query. Internal configuration information of the relay 110 may include relay metadata associated with the particular device 114 and/or user associated with the particular device 114. For example, if the relay 110 is a wireless relay, wireless location services are accessed to gather information from the access points and triangulate the location of the device 114 using wireless signal strengths. As another example, if the relay 110 is a wired relay, the relay 110 determines the device 114's location using known information about the location of each of the endpoint of the wired connections. Such location information can be appended to the DNS query. Identity and internal configuration information is included in the relay 110 and/or database 112. As another example, the particular metadata appended to the DNS query may depend upon the particular service requested.

In some embodiments, block 210 may be optional if the metadata will be provided by the DNS server 102, as discussed herein for block 216.

Next, in block 212, the relay 110 sends both the DNS query and metadata (appropriate and/or available device metadata, user metadata, and/or relay metadata) to the DNS server 102, via network 120. In FIG. 1, an example communication 132 is shown denoting the transmission from the relay 110 to DNS server 102. The communication 132 comprises a uni-cast transmission of the DNS query (denoted as "Q") and appended metadata (denoted as "M'").

Communication 132 is received by the DNS server 102 at block 214. In response, at block 216, the dynamic service discovery synthesizer 104 included in the DNS server 102 accesses server metadata associated with the particular device 114 making the query. Server metadata comprises data about the device 114 known or maintained by the DNS server 102, DHCP server 108, and/or database 106 as well as other data that may be relevant to reply to the query. Server metadata may duplicate some of the metadata sent by the relay 110. Server metadata is accessed to confirm authenticity of at least a portion of the received metadata, to supplement the received metadata, to replace at least a portion of the metadata, and/or to confirm authenticated access to the DNS server 102. Examples of server metadata include, but are not limited to, requesting machine or subscriber identity (e.g., via DHCP or AAA lookup of the device 114's IP address), geographic location of the source of the query (e.g., a building identifier, a floor of a particular building, a section of a particular building, via DHCP or AAA lookup, via location of relay 110), machine or subscriber organizational affiliation (e.g., via DHCP or AAA lookup), date or time of day, current load or availability of target devices (e.g., instances 118), target device characteristics, machine or subscriber system information (e.g., Android, iOS, MacOS, Windows, Linux, application), machine or subscriber connection characteristics (e.g., wired or wireless, estimated bandwidth), and the like.

At least a portion of the server metadata may be obtained by the DHCP server 108 during an IP address assignment process for the particular device 114, when the requesting device was first added to the system 100. The DHCP server 108 may have requested the device 114 to provide certain information, such as its organizational affiliation or identity information (via an authorization process), and/or automatically obtained or detected other information about the device 114, such as location information (via prior knowledge of locations of relay agents), in order to map the device's IP address to metadata relating to the device. The DHCP server 108 may then push the IP address and associated metadata to the DNS server 102 for storage and maintenance. DNS server 102, in turn, may store such information in the database 106. Alternatively, such information may be retained by the DHCP server 108, and the DNS server 102 can request the information from the DHCP server 108 when a DNS query is made by the particular device 114.

Each of the instances 118 similarly undergoes an IP address assignment process with the DHCP server 108 when first added to the system 100. When an instance 118 is first added to the system 100, the instance 118 sends out a DNS message advertising the availability of its service(s). For example, if the particular instance 118 is a color printer, it advertises its printing capability. The DNS message is received by the DNS server 102. The DNS server 102, in turn, coordinates with the DHCP server 108 to generate a set of DNS-SD records for that instance 118 along with provision of a unique IP address. Information about the instance 118 is also captured at this time, similar to the discussion above. For example, where the instance 118 is located (e.g., in which building), ownership or organizational affiliation of the instance 118, identity information (e.g., user friendly assigned name), the specific kind of service(s) it is capable of providing (e.g., color printing as opposed to monochrome printing), and the like. In some embodiments, such information about the instance 118 is stored in the DNS-SD records. In other embodiments, such information may be stored in a separate record or database, or as metadata maintained by the DHCP server or DNS server 102 but not within the DNS-SD records.

In some embodiments, the DNS server 102 may be in a position to supplement the metadata previously obtained by the DHCP server 108 for the device 114 and/or instances 118. For example, metadata that may be contemporaneous to the DNS query, such as the current date and/or time of day or current location of the requesting device 114 (e.g., via known location of the relay 110 forwarding the DNS query, in which the location of the relay 110 is assumed to be a proxy for that of the device 114 due to the short communication range capability of the relay 110). Also, metadata that may be contemporaneous to the DNS query and concerning the instances 118, such as the current load, availability, or other conditions relevant to providing service by each of the instances 118 of interest.

The server metadata may accordingly comprise two parts: metadata maintained or known by the DNS server 102 and/or DHCP server 108 that is associated with the device 114, and metadata maintained or known by the DNS server 102 and/or DHCP server 108 that is associated with the instances 118.

In some embodiments, block 216 may be optional if the metadata is provided by the device 114 and/or relay 110 as discussed above.

In block 218, the dynamic service discovery synthesizer 104 dynamically selects one or more instance(s) 118 from the set of instances 118 matching the DNS query and metadata. The dynamic service discovery synthesizer 104 performs service discovery based on more than just the DNS query in a manner transparent to the requesting device 114. In one embodiment, the synthesizer 104 performs the dynamic selection in accordance with a pre-defined selection rule or constraints based on the DNS query and metadata associated with the requesting device 114. As discussed above in connection with blocks 204, 210, and 216, metadata associated with the requesting device 114 comprises device metadata and/or user metadata provided by the device 114; relay metadata provided by the relay 110; and/or server metadata provided by the DNS server 102 and/or DHCP server 108.

FIG. 3 illustrates an example block diagram depicting the dynamic selection performed by the synthesizer 104. A DNS query 302 and metadata 304 associated with the requesting device 114 are inputs to the synthesizer 104. The synthesizer 104 includes one or more pre-defined selection rules or constraints 308. Based on the DNS query 302, metadata 304, and selection rules/constraints 308, the synthesizer 104 outputs a dynamic response list 306 of instance(s) 118 matching the selection criteria. The dynamic response list 306 comprises a list of PTR records corresponding to the matching instance(s) 118.

The selection rules/constraints 308 may comprise any rule defining which and/or how the DNS query 302 and metadata 304 should be used to search for matching instance(s) 118. The selection rules/constraints 308 may comprise an additional selection criterion that is not device 114- or instance 118-specific or is in addition to the DNS query and metadata. Examples of selection rules/constraints 308 include, but are not limited to:

To achieve load balancing: Instance(s) 118 found based on the DNS query 302 and metadata 304 are further refined based on current load conditions of those instance(s) 118 to achieve load balancing.

To prove differentiation among different classes of users (e.g., student, faculty, administrator): At least the user associated with the requesting device 114 identified in the metadata 304 is used to determine the class of user, and then different classes of users map to specific instance(s) 118.

To assign a class of devices to one set of services by providing a specific search domain To achieve power management: Certain instance(s) 118 may be shut down at certain hours or days to save power so as to make them unavailable at those times.

To take into account real-time or near real-time conditions of the instances 118: Instances 118 that are currently unavailable due to a malfunction, maintenance, or other unavailability are excluded from the dynamic response list 306.

To specify which of the metadata 304 to use: As discussed above, metadata 304 may comprise a plurality of information about the device 114. This rule specifies which of the particular information from among the plurality of information to use in querying the DNS-SD records. For example, location proximity may be the top searching criteria. As another example, location proximity and fastest connection may be the top searching criteria.

To maintain secured access to instances 118: If a matching instance 118 is located in a secured area requiring passing through a security guard or other security measures but the user associated with the device 114 does not have security clearance or otherwise will not be allowed into the secured area at the current time, such instance 118 is excluded from the dynamic response list 306.

To restrict to a reasonable location proximity to each other: Only instance(s) 118 located within the same building, same floor of a building, or other pre-defined same proximity distance to the device 114 may be included in the response list 306.

Current time of day

Combinations of two or more rules above

No rule/constraint.

The particular selection rules/constraints 308 used by the synthesizer 104 can change over time as more or different rules are added and/or as the rules themselves may be applicable in accordance with a pre-defined schedule.

The DNS server 102 dynamically discovers one or more instances 118 using at least the SRV and TXT records of the DNS-SD records matching the DNS query 302, metadata 304 associated with the device 114, and the selection rules/constraints 308. The metadata 304 and/or the selection rules/constraints 308 cause service discovery to be restricted to a particular logical domain or subset domain that is narrower in scope than the actual domain named in the DNS query 302. The limited service discovery occurs even though the DNS query generated and transmitted to the DNS server 102 comprises a conventional or standard DNS query including an FQDN prefix and domain.

Alternatively, the selections rules/constraints 308 may be omitted and the dynamic response list 306 can be determined based on searching the DNS-SD records based on the DNS query 302 and metadata 304.

Returning to FIG. 2, once the instance(s) 118 matching the search or query criteria are found, the synthesizer 104 synthesizes the dynamic response list 306 in real-time or near real-time in block 220. Synthesis of the PTR record list may comprise textual construction of the PTR records using textual string manipulation. Continuing the example above, further assume that the selection rules/constraints 308 comprise restricting service discovery to the same building in which the requesting device 114 is currently located. In large organizations, it may not be desirable for the browsers 116 to perform service discovery over the entire organization's service discovery name space. Returning a list of matching instances 118 located in all buildings for the organization, especially when there are many buildings, is not particularly useful for the user. Instead, the list of matching instances can be controlled in one embodiment, by the search domain returned to the browser, such as BXB200-1.example.com. The b._dns-sd._udp.example.com query (e.g., DNS query 302) made by the device 114 located in building BXB200 returns only those PTR records associated with matching instances 118 also located in building BXB200 (e.g., response list 306):

b._dns-sd._udp.example.com. PTR BXB200-1.example.com
b._dns-sd._udp.example.com. PTR BXB200-2.example.com,
in which the first instance 118 is located in the first floor of building BXB200 and the second instance is located in the second floor of building BXB200.

Conversely, if the same requesting device 114 is located in building SJC01, the same b._dns-sd._udp.example.com query causes only those PTR records associated with matching instances 118 located in building SJC01 to be returned to the device 114:
b._dns-sd._udp.example.com. PTR SJC01-1.example.com
b._dns-sd._udp.example.com. PTR SJC02-2.example.com,
in which the first instance 118 is located in the first floor of building SJC01 and the second instance is located in the second floor of building SJC02.

Thus, the same DNS query may return different PTR records associated with different instances 118 depending on the metadata appended with the DNS query. This is in contrast to conventional DNS-SD, in which the same query returns the same list of PTR records regardless of characteristics or attributes of the device 114 that issued the query. Under conventional DNS-SD, the b._dns-sd._udp.example.com query returns PTR records for instances 118 located in all buildings of the organization, namely:
b._dns-sd._udp.example.com. PTR BXB200-1.example.com
b._dns-sd._udp.example.com. PTR BXB200-2.example.com
b._dns-sd._udp.example.com. PTR SJC01-1.example.com
b._dns-sd._udp.example.com. PTR SJC02-2.example.com.

In another embodiment, the list of PTR responses may be synthesized by the DNS server 102 based on the metadata associated with the query and other information available to the DNS server 102. For example, consider four instances of the IPP printing service available at example.com:
_ipp._tcp.example.com PTR printer1._ipp._tcp.example.com
_ipp._tcp.example.com PTR printer2._ipp._tcp.example.com
_ipp._tcp.example.com PTR printer3_ipp._tcp.example.com
_ipp._tcp.example.com PTR printer4_ipp._tcp.example.com If the DNS server 102 receives a query for ipp. tcp. example.com, it will evaluate the metadata associated with the query, along with other information available to the DNS server 102, and synthesize a list of PTR RRs of interest to the query. In this example, if printer1 is in a different building from the requesting device and printer3 is powered off, the DNS server 102 would return only the RRs for printer2 and printer4 to the requesting device.

The synthesized response list is transmitted by the DNS server 102 to relay 110, via network 120, in block 222. In block 224, the relay 110 receives the response list from the DNS server 102 and relays the response list to the requesting device 114. In some embodiments, the relay 110 may perform one or more processing operations and/or append information (e.g., header or authentication information) to the response list prior to relaying to the device 114.

In response, the device 114 receives the response list corresponding to the DNS query in block 226. FIG. 1 illustrates an example communication 134 denoting the return of the response list from the DNS server 102 to the device 114 in response to the DNS query, via network 120 and relay 110. The communication 134 comprises a uni-cast transmission of the response list (denoted as "R"). Returning to FIG. 2, the service discovery browser 116 included in the device 114 presents the response list on a display of the device 114 in block 228. In some embodiments, the browser 116 may display a user-friendly version of the response list on the device 114, such as displaying a list of user recognizable names of the instance(s) 118 identified in the response list, rather than the PTR records per se. The browser 116 may also provide information about each of the listed instance(s) 118 such as indicating where each is located relative to the device 114. Hence, the dynamic DNS-SD techniques described herein permit differential configuration of the browsers 116 in accordance with the differential configuration information or names corresponding to instances 118 returned in the response list.

In block 230, the device 114 receives a user selection of a particular instance 118 from among the response list (or equivalent thereof). And responsive to the user selection, the browser 116 generates and transmits a DNS query for the SRV RR corresponding to the selected instance 118 in block 232. This DNS query requests the FQDN and other information associated with the selected instance 118, as contained in the SRV RR for the specific instance. This DNS query is generated in preparation of establishing a connection between the device 114 and the selected instance 118 to obtain the desired service from the selected instance 118.

The DNS query is received by the relay 110 and relayed by the relay 110 to the DNS server 102 in block 234. Relay 110 may perform one or more processing operations and/or append information to the DNS query prior to transmission to the DNS server 102. In block 236, the DNS server 102 receives the DNS query. In response, the DNS server 102 performs a lookup in the DNS RRs associated with the selected instance 118 to obtain the requested FQDN and other information associated with the selected instance 118 (located in the SRV RR) and also the IP address or addresses associated with the FQDN (located in the A and/or AAAA RRs), in block 238. The FQDN and IP address(es) are returned, in block 240, from the DNS server 102 to the relay 110.

The relay 110, in turn, relays the DNS name and the IP address to the device 114 in block 242. The IP address received by the device 114, in block 244, is used by the device 114 to establish a connection with the selected instance 118 in block 246.

Accordingly, dynamic DNS-SD techniques are described herein that provides flexibility in restricting service discovery to a particular logical domain within a domain even though the DNS-SD query itself is configured for service discovery over the entire name space of the domain. The DNS server responds to the DNS-SD query by searching the name space of the domain specified in the query in accordance with metadata associated with the device making the query. Metadata appended to the DNS-SD query includes information pertaining to the identity, characteristics, and/or attributes of the device and/or user associated with the device making the query. The metadata comprises information that cannot be encoded in the DNS query prefix used to located appropriate configuration names of instances. The metadata may be provided by the device making the DNS query, any relay forwarding the DNS query to the DNS server, and/or the DNS server. Metadata comprises additional query parameters that are transparent to the device making the query. Example metadata includes, but is not limited to, location, identity, role, or source IP address. In some embodiments, the selection criteria may further include selection rules or constraints that may be independent of the device making the request. Examples of selection rules or constraints include, but are not limited to, power saving management rules, current load of target instances, or current availability of target instances.

By returning variable or different replies (e.g., different lists of PTR records corresponding to target devices) to a same given DNS-SD query, a technique is provided in which different service discovery browsers included in requesting devices can be configured with different search domain lists for the same given DNS-SD query. The configuration information or names returned in response to the same given DNS-SD query need not be constant or fixed regardless of the characteristics of the requesting device. In this manner, target devices identified in the DNS-SD query reply are dynamically selected to be directly relevant to the current state of the particular device making the query and the state of the surrounding environment.

3.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
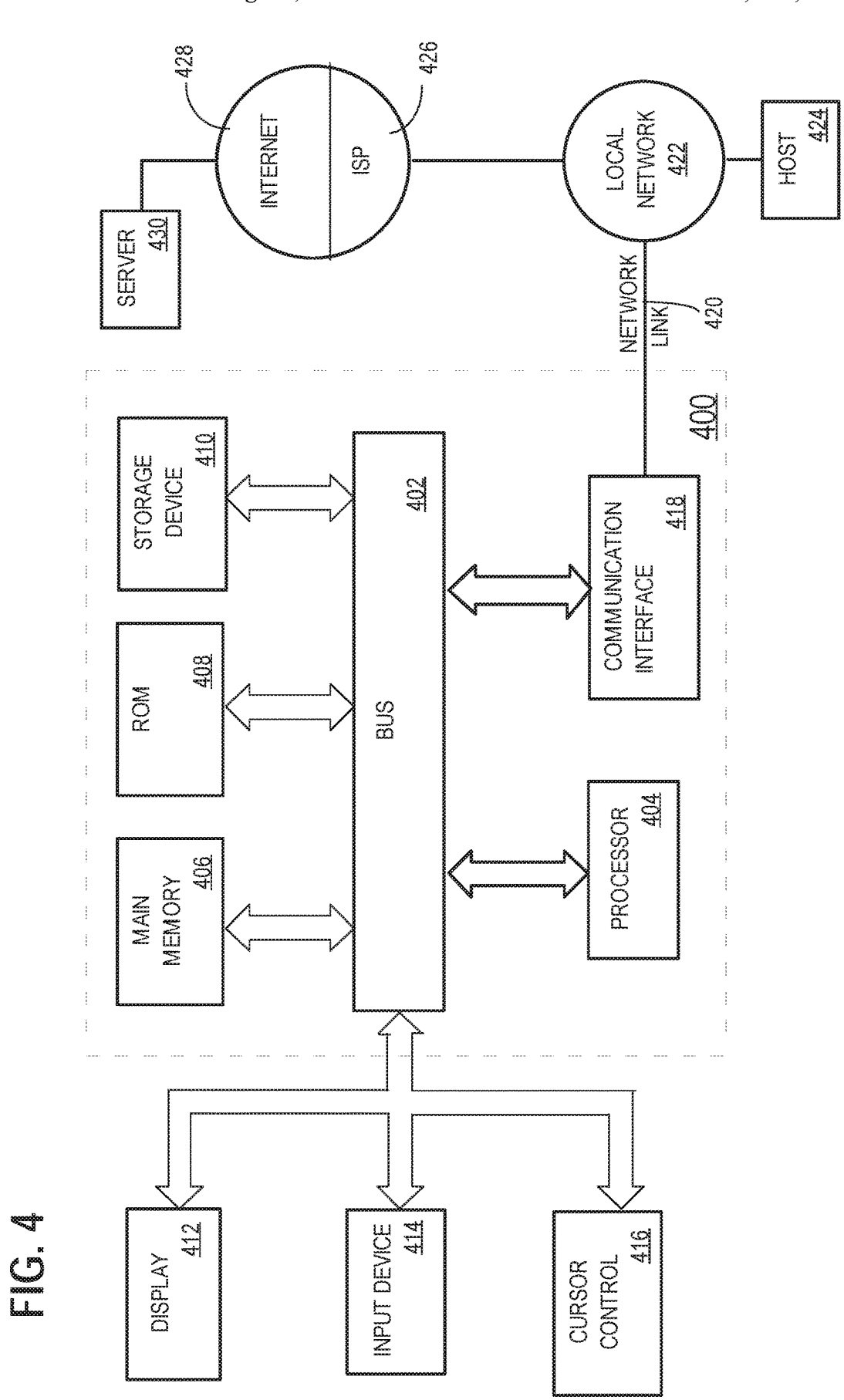
FIG. 4 illustrates a block diagram of an example computer system upon which embodiments of the present disclosure may be implemented.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

4.0 Other Disclosure

1. An apparatus, comprising: one or more databases; one or more transceivers to receive a first Domain Name System (DNS) query from a first computing device, the first DNS query defining a first service discovery name space; one or more processors in communication with each of the one or more databases and the one or more transceivers, wherein the one or more processors generate and append a first metadata associated with the first computing device to the first DNS query, at least a portion of the first metadata obtained from the one or more databases, wherein the one or more transceivers transmit the first DNS query and the first metadata to a Domain Name System (DNS) server computer, receive, from the DNS server computer, a first response responsive to the first DNS query, the first response comprising identification of one or more service providing computing devices within a subset of the first service discovery name space in accordance with the first DNS query and the first metadata associated with the first computing device, and relay, to the first computing device, the first response.

2. The apparatus of clause 1, wherein the first metadata comprises at least one of a device identity, a user identity, a geographic location, a device organizational affiliation, a user organizational affiliation, a date or time of day, a current load of the one or more of the service providing computing devices, a current availability of the one or more of the service providing computing devices, a device system information, a device operating system information, a device connection characteristic, a device connection type, or a device characteristic, wherein 3. The apparatus of clause 1, wherein the first response comprises identification of the one or more service providing computing devices within the subset of the first service discovery name space in accordance with the first DNS query, the first metadata associated with the first computing device, and a second metadata associated with the first computing device from the DNS server computer.

4. The apparatus of clause 1, wherein at least one of the service providing computing devices identified in the first response is located within a local network of the first computing device or outside the local network of the first computing device, wherein the first DNS query includes a Fully Qualified Domain Name (FQDN) comprising a domain name and one of special prefixes, the domain name defining the first service discovery name space.

5. The apparatus of clause 1, wherein the one or more transceivers receive the first DNS query via a wired or wireless connection with the first computing device.

6. The apparatus of clause 1, wherein the apparatus comprises at least one of a relay, a router, a switch, a gateway, a firewall, or a repeater.

7. A data processing method comprising: receiving, at a Domain Name System (DNS) server computer, a Domain Name System-based Service Discovery (DNS-SD) query generated by a first computing device; using the DNS server computer, dynamically selecting one or more service providing computing devices from DNS resource records based on the DNS-SD query and metadata associated with the first device; using the DNS server computer, synthesizing a query response corresponding to the dynamically selected one or more service providing computing devices, the query response including pointer (PTR) resource records associated with the dynamically selected one or more service providing computing devices; using the DNS server computer, transmitting the query response to the first computing device; wherein the method is performed by one or more computing devices.

8. The method of clause 7, wherein the DNS-SD query includes a Fully Qualified Domain Name (FQDN) composed of a domain name and one of special prefixes, the domain name defining a service discovery name space and the metadata restricting service discovery to a particular logical domain within the service discovery name space.

9. The method of clause 7, further comprising: receiving a second DNS-SD query generated by a second computing device, wherein the second DNS-SD query is identical to the DNS-SD query; dynamically selecting one or more second service providing computing devices from the DNS-SD resource records based on the second DNS-SD query and second metadata associated with the second computing device; synthesizing a second query response corresponding to the dynamically selected one or more second service providing computing devices, wherein the second query response is different from the query response; transmitting the second query response to the second computing device.

10. The method of clause 7, wherein receiving the DNS-SD query comprises receiving the metadata appended with the DNS-SD query.

11. The method of clause 10, wherein the metadata is generated by a relay communicatively located between the first computing device and the DNS server computer.

12. The method of clause 10, wherein the metadata is generated by the first computing device.

13. The method of clause 7, wherein the metadata is generated by the DNS server computer or Dynamic Host Configuration Protocol (DHCP) server.

14. The method of claim 7, wherein dynamically selecting the one or more service providing computing devices comprises dynamically selecting the one or more service providing computing devices from the DNS-SD resource records in accordance with a pre-defined selection rule based on the DNS-SD query and the metadata associated with the first computing device.

15. A non-transitory computer-readable data storage medium storing one or more sequences of instruction which, when executed by one or more processors, cause performing a method comprising: receiving, at a Domain Name System (DNS) server computer, a Domain Name System-based Service Discovery (DNS-SD) query generated by a first computing device; dynamically selecting one or more service providing computing devices from DNS resource records based on the DNS-SD query and metadata associated with the first computing device; synthesizing a query response corresponding to the dynamically selected one or more service providing computing devices, the query response including pointer (PTR) resource records associated with the dynamically selected one or more service providing computing devices; transmitting the query response to the first computing device.

16. The non-transitory computer-readable data storage medium of clause 15, wherein the DNS-SD query includes a Fully Qualified Domain Name (FQDN) comprising a domain name and one of special prefixes, the domain name defining a service discovery name space and the metadata restricting service discovery to a particular logical domain within the service discovery name space.

17. The non-transitory computer-readable data storage medium of clause 15, further comprising instructions which when executed cause: receiving a second DNS-SD query generated by a second computing device, wherein the second DNS-SD query is identical to the DNS-SD query; dynamically selecting one or more second service providing computing devices from the DNS-SD resource records based on the second DNS-SD query and second metadata associated with the second computing device; synthesizing a second query response corresponding to the dynamically selected one or more second service providing computing devices, wherein the second query response is different from the query response; transmitting the second query response to the second computing device.

18. The non-transitory computer-readable data storage medium of clause 15, wherein receiving the DNS-SD query comprises receiving the metadata appended with the DNS-SD query.

19. The non-transitory computer-readable data storage medium of claim 18, wherein the metadata is generated by at least one of a relay communicatively located between the first computing device and the DNS server computer, the first computer device, and the DNS server computer or Dynamic Host Configuration Protocol (DHCP) server.

20. The non-transitory computer-readable data storage medium of clause 15, wherein dynamically selecting the one or more service providing computing devices comprises dynamically selecting the one or more service providing computing devices from the DNS-SD resource records in accordance with a pre-defined selection rule based on the DNS-SD query and the metadata associated with the first computing device, wherein the pre-defined selection rule comprises at least one of a power management rule, a physically accessible rule, a load balancing rule, a device class differentiation rule, or a device class service differentiation rule.

5.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computing device, comprising:
one or more processors; and
storage storing instructions which, when executed by the one or more processors, cause the one or more processors to:
receive an indication of a requested service;
based at least in part on the indication, generate a first Domain Name System (DNS) query naming a domain for a DNS-based Service Discovery associated with the requested service;
generate first metadata associated with the computing device by selecting from among user metadata available at the computing device, the first metadata including the user metadata and at least one constraint on selecting from among service providers associated with the domain in the DNS-based Service Discovery to provide the requested service;
append the first metadata including the user metadata to the first DNS query; transmit the first DNS query with the first metadata to a DNS server computer;
receive, from the DNS server computer, a response list comprising a subset of the service providers, the subset having been selected based at least in part on the at least one constraint of the first metadata; and
cause the response list to be presented.

2. The computing device of claim 1, wherein the instructions further cause the one or more processors to:
generate the first metadata by selecting from among device metadata available at the computing device,
wherein the device metadata comprise at least one of a device system information, a device operating system information, a device connection characteristic, a device connection type, a device geographic location, and a device topological location, and wherein the user metadata available at the computing device comprise at lease one of user identifier information, a user preference, and user authorization information.

3. The computing device of claim 1, wherein the first user metadata comprise a user preference, and wherein the response list comprises identification of service providers that correspond to the user preference.

4. The computing device of claim 1, wherein the instructions further cause the one or more processors to:
generate the first metadata by selecting from among device metadata available at the computing device,
wherein the first metadata include a topological location of the computing device and wherein at least one of the service providers of the subset is located within a local network of the computing device.

5. The computing device of claim 1, wherein the instructions further cause the one or more processors to:
receive another indication identifying a selection from the response list;
in response to the selection, generate a second DNS query; and
send the second DNS query to the DNS server computer.

6. The computing device of claim 5, wherein the instructions further cause the one or more processors to:
receive, in response to the second DNS query, an address of a particular service provider of the subset corresponding to the selection from the response list; and
communicate with the particular service provider using the address.

7. A method comprising:
receiving, by a computing device, an indication of a requested service;
based at least in part on the indication, generating a first Domain Name System (DNS) query naming a domain for a DNS-based Service Discovery associated with the requested service;
generating first metadata associated with the computing device by selecting from among multiple types of user metadata available at the computing device, the first metadata comprising at least one constraint on selecting from among service providers associated with the domain in the DNS-based Service Discovery to provide the requested service;
appending the first metadata including the user metadata to the first DNS query; transmitting the first DNS query with the first metadata to a DNS server computer;
receiving, by the computing device and from the DNS server computer, a response list comprising a subset of service providers, the subset having been selected based at least in part on the at least one constraint of the first metadata; and
causing the response list to be presented.

8. The method of claim 7, further comprising:
generating the first metadata by selecting from among multiple types of device metadata available at the computing device,
wherein the device metadata available at the computing device comprise at least one of a device system information, a device operating system information, a device connection characteristic, a device connection type, a device geographic location, and a device topological location.

9. The method of claim 8, wherein the device metadata include a topological location of the computing device and wherein at least one of the service providers of the subset is located within a local network of the computing device.

10. The method of claim 9, wherein the at least one constraint of the first metadata restricts, from the response list, another service provider that is associated with the domain of the DNS-based Service Discovery and is not within the local network of the computing device.

11. The method of claim 7, further comprising:
receiving another indication identifying a selection from the response list;
in response to the selection, generating a second DNS query; and
sending the second DNS query to the DNS server computer.

12. The method of claim 11, further comprising:
receiving, in response to the second DNS query, an address of a particular service provider of the subset corresponding to the selection from the response list; and
communicating with the particular service provider using the address.

13. The method of claim 7, wherein the at least one constraint of the first metadata is related to a geographic location of the computing device.

14. The method of claim 7, further comprising:
receiving a user preference associated with the requested service,
wherein the user metadata comprises the user preference.

15. A method comprising:
receiving, by a computing device, an indication of a requested service;
based at least in part on the indication, generating a first Domain Name System (DNS) query naming a domain for a DNS-based Service Discovery associated with the requested service;
generating first metadata at least in part by selecting from among multiple types of user metadata;
appending the first metadata to the first DNS query, the first metadata comprising at least one constraint on selecting from among service providers associated with the domain in the DNS-based Service Discovery to provide the requested service;
transmitting the first DNS query with the first metadata including the user metadata to a DNS server computer;
receiving, by the computing device and from the DNS server computer, a response list comprising a subset of service providers, the subset having been selected based at least in part on the at least one constraint of the first metadata; and
causing the response list to be presented.

16. The method of claim 15, wherein the generating the first metadata is performed in a first instance and the first metadata are associated with a geographic location of the computing device, the method further comprising:
in a second instance at a second geographic location of the computing device, generating a second DNS query naming the domain;
generating second metadata associated with the second geographic location of the computing device;
appending the second metadata to the second DNS query; and
transmitting the second DNS query with the second metadata to the DNS server computer.

17. The method of claim 16, further comprising:
receiving, by the computing device and from the DNS server computer, a second response list comprising a second subset of the service providers, the second subset being different than the subset in the first instance; and
causing the second response list to be presented.

18. The method of claim 16, wherein the DNS server computer in the first instance and the second instance is the same DNS server computer or a different DNS server computer.

19. The method of claim 15, wherein the computing device is a mobile device and the requested service is a printing service.

20. The method of claim 15, wherein the subset is selected in accordance with a pre-defined selection rule based on the first DNS query and the first metadata, wherein the predefined selection rule comprises a physically accessible rule.

* * * * *